(12) United States Patent
Anderson

(10) Patent No.: US 7,280,476 B2
(45) Date of Patent: Oct. 9, 2007

(54) TRAFFIC CONTROL AT A NETWORK NODE

(75) Inventor: Eric Anderson, Palo Alto, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 1076 days.

(21) Appl. No.: 10/186,880

(22) Filed: Jun. 28, 2002

(65) Prior Publication Data

US 2003/0223369 A1   Dec. 4, 2003

Related U.S. Application Data

(60) Provisional application No. 60/385,997, filed on Jun. 4, 2002.

(51) Int. Cl.
*H04L 12/26* (2006.01)
*H04L 12/56* (2006.01)

(52) U.S. Cl. .................. 370/235; 370/230; 370/412

(58) Field of Classification Search ................ None
See application file for complete search history.

(56) References Cited

U.S. PATENT DOCUMENTS

| | | | | |
|---|---|---|---|---|
| 5,274,644 A | * | 12/1993 | Berger et al. | 370/230 |
| 5,533,009 A | * | 7/1996 | Chen | 370/232 |
| 6,046,979 A | * | 4/2000 | Bauman | 370/229 |
| 6,147,970 A | | 11/2000 | Troxel | |
| 6,826,147 B1 | * | 11/2004 | Nandy et al. | 370/229 |
| 6,965,566 B2 | * | 11/2005 | Kawasaki et al. | 370/235 |

FOREIGN PATENT DOCUMENTS

WO    WO 02/21773 A2    3/2002

* cited by examiner

*Primary Examiner*—Steven Nguyen

(57) ABSTRACT

A method for controlling traffic flow at a network node including updating a plurality of credit buckets over multiple time intervals and determining an adjusted credit value for a credit bucket when the credit bucket is accessed to forward a packet, the adjusted credit value being determined as a function of a number of the time intervals that have elapsed since the credit bucket was last updated, the credit bucket being one of the plurality of credit buckets.

48 Claims, 8 Drawing Sheets

TRAFFIC CONTROL AT A NETWORK NODE

CROSS REFERENCE TO RELATED APPLICATION

This application is entitled to the benefit of provisional Patent Application Ser. No. 60/385,997, filed Jun. 4, 2002.

FIELD OF THE INVENTION

The invention relates to network traffic control, and more particularly to a credit bucket mechanism for providing network traffic control at a network node.

BACKGROUND OF THE INVENTION

Traffic engineering, in its simplest form, attempts to meet the quality of service (QOS) needs of multiple users by making the best use of limited network resources. Traffic engineering also can be used to ensure that a packet or data source adheres to a stipulated contract.

Two basic types of traffic engineering mechanisms include; traffic policing mechanisms (policers) and traffic shaping mechanisms (shapers). Policers and shapers both use a packet's traffic descriptor, indicated by the packet's classification, to ensure QOS and adherence to the stipulated contract by a given data source. Policers and shapers typically identify traffic descriptor violations in a similar manner. However, policers and shapers usually differ in the way they respond to violations; a policer will typically drop the excess traffic, whereas a shaper will typically delay excess traffic using a buffer, or queuing mechanism, to hold packets and shape the flow when the data rate of the source is higher than expected.

Credit buckets, also known as token buckets, are mechanisms that can be used to implement policers and/or shapers. A credit bucket has three components: a burst size, a mean rate, and a time interval (Tc). The three components are related to each other according to the following equation: mean rate=burst size/time interval. The mean rate specifies how much data can be sent or forwarded per unit time on average. The burst size specifies, usually in bits per burst, how much data can be sent per a given unit of time while avoiding scheduling concerns. The time interval is the measurement interval and specifies the time quantum, for example, in seconds per burst.

Utilizing a credit bucket algorithm, each credit provides permission to forward a certain number of bits within a network. A bucket holds credits for a particular class of network traffic and credits are added into the bucket at a specified rate. For example, a fixed number of credits is added to the credit bucket at fixed time intervals. To forward a packet, a number of credits equal in bit size to the packet must be removed from the bucket. For example, if each credit represents 1,000 bits then a packet of 100,000 bits will have an equivalent credit value of 100 credits. If the number of credits in the bucket is equal to or exceeds the credit requirement of the packet, then the packet is forwarded. If, however, the number of credits in the bucket is below the credit requirement of the packet, then the packet is either held until the bucket has enough credits to forward the packet or the packet is dropped.

Credit buckets continue to accumulate credits even when there is no traffic to forward. In order to limit the magnitude of the traffic bursts, the accumulation of credits in a bucket can be capped at a maximum value. When a credit bucket reaches its maximum value, additional credits are no longer accumulated.

In communications networks that classify traffic into multiple traffic classes, traffic engineering mechanisms, such as credit buckets, are typically implemented on a per-class basis. When using credit buckets as traffic engineering mechanism as described above, the credit buckets must all be periodically updated (i.e. refreshed with new credits). In typical credit bucket implementations, the credit buckets are updated during the same time interval. For example, every credit bucket is updated every one microsecond (μs). FIG. 1A depicts an embodiment of a prior art system comprising one-hundred (100) credit buckets that are each updated at every time interval. FIG. 1B depicts a graph of credits per bucket as a function of elapsed time for a specific one of the one-hundred buckets depicted in FIG. 1A, i.e., bucket zero (0). As the graph indicates, since the credit bucket is updated at every time interval, the number of credits in the bucket at a particular time is a function of the number of time intervals that have elapsed. For example, at any time X, the number of credits in bucket zero is equal to [(X)*(credit bucket refresh rate)], assuming no credits have been removed as a result of forwarding packets.

Although updating each credit bucket at every time interval works well to provide a constant refresh rate to the credit buckets, refreshing every credit bucket during every time interval becomes problematic as the number of credit buckets increases. Specifically, the amount of hardware resources that are required to update every credit bucket at every time interval are costly, both financially and also in terms of the real estate required on the integrated circuits used in such an implementation. Therefore, what is needed is a resource-efficient credit bucket mechanism that can scale to a large number of credit buckets.

SUMMARY OF THE INVENTION

A technique for controlling traffic flow at a network node involves updating a plurality of credit buckets over multiple time intervals and determining an adjusted credit value for a credit bucket when the credit bucket is accessed to forward a packet, the adjusted credit value being determined as a function of a number of the time intervals that have elapsed since the credit bucket was last updated, the credit bucket being one of the plurality of credit buckets.

In an embodiment, the method also includes determining whether to allow the respective packet to be forwarded in response to the adjusted credit value.

In an embodiment, the updating of a plurality of credit buckets is performed on a round-robin basis. That is, a portion of the total number of credit buckets is updated at each time interval.

In an embodiment, the adjusted credit value is a function of a prorated credit value, where the prorated credit value represents credits that have accrued during the time since the last update. In another embodiment, the adjusted credit value is a function of an actual credit value. In yet another embodiment, the adjusted credit value is a function of a prorated credit value and an actual credit value.

Updating a portion of the credit buckets at each time interval enables a large number of credit bucket algorithms to be implemented at a substantial savings of hardware resources. In addition, determining adjusted credit values for credit buckets results in a credit bucket performance that is similar to the performance that is achieved when every credit bucket is updated at every time interval.

Other aspects and advantages of the present invention will become apparent from the following detailed description,

DETAILED DESCRIPTION OF THE INVENTION

Figure 2A:
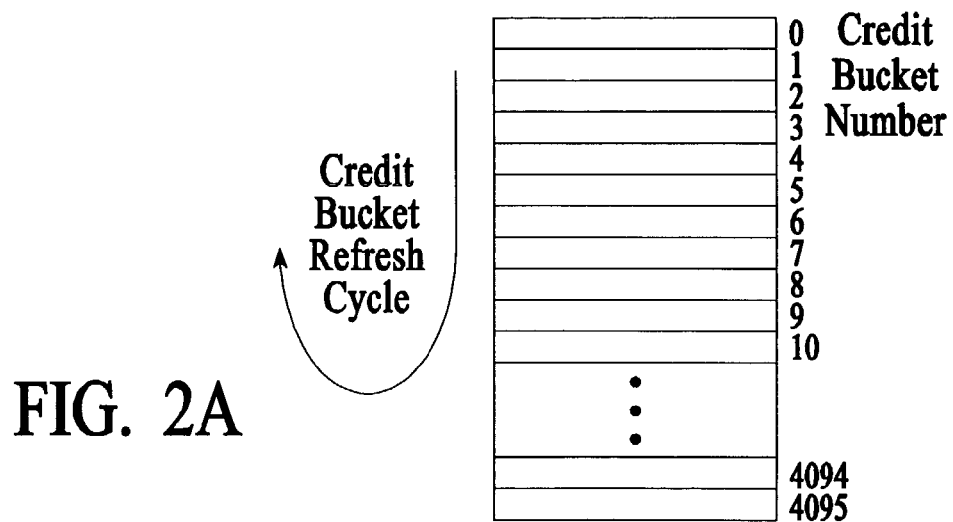
FIG. 2A depicts an embodiment of a system comprising 4K (4,096) credit buckets that is suitable for implementing 4,096 individual credit bucket algorithms, in accordance with an embodiment of the invention.

FIG. 2A depicts an embodiment of a system comprising 4K (4,096) credit buckets that is suitable for implementing 4,096 individual credit bucket algorithms. In the embodiment of FIG. 2A, the group of credit buckets is updated in multiple updates such that a portion of the group of credit buckets is updated in each of the multiple updates. In an embodiment, through the course of all of the multiple updates, all of the credit buckets in the group are updated. In an embodiment, the group of credit buckets is refreshed one bucket per time interval on a round-robin basis. The number of credit buckets (4,096) is exemplary only; more or fewer credit buckets may be used. The term "token" is used interchangeably with the term "credit". The term "update" means to refresh a credit bucket with a new allotment of credits.

In an embodiment, one bucket is updated every time interval on a round-robin basis, such that one cycle of updates is completed in 4,096 time intervals. In an embodiment, each time interval is 1 microsecond (µs), and therefore a cycle is completed every 4,096 µs. That is, one credit bucket is updated in every time interval for each of the 4,096 buckets until all buckets are updated and then the process is repeated.

Figure 2B:
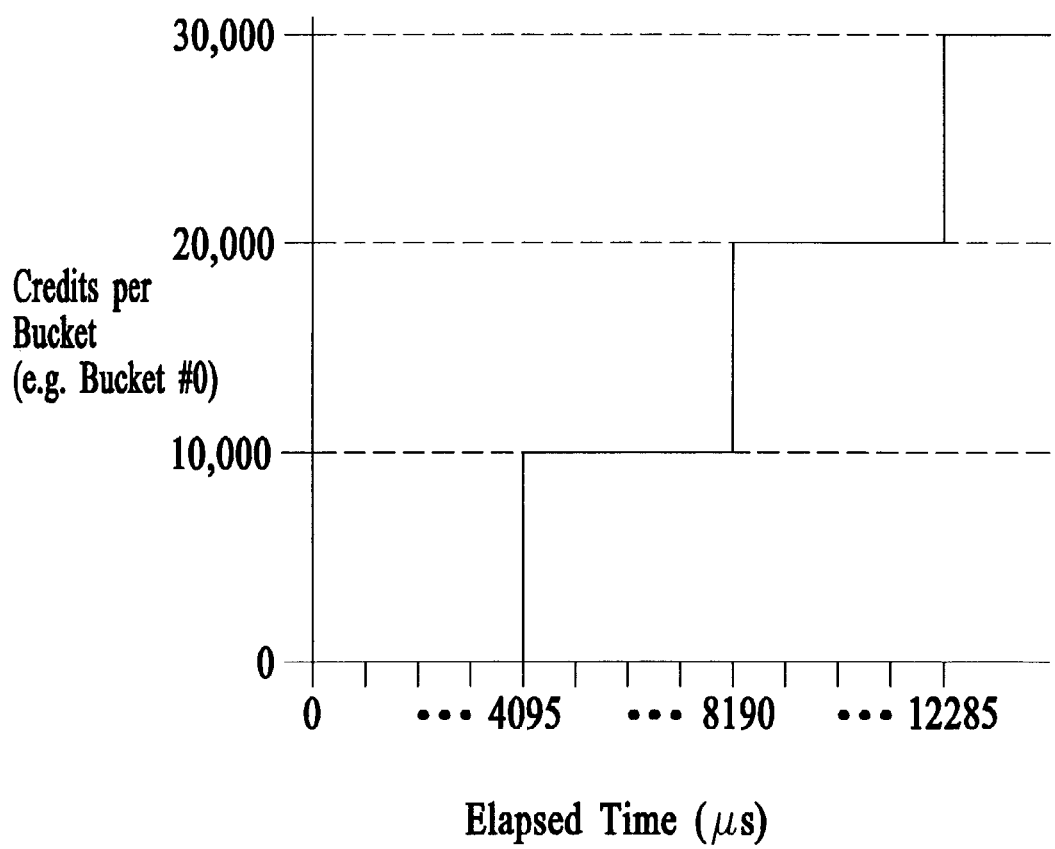
FIG. 2B depicts a graph of credits per bucket as a function of elapsed time for a specific one of the group of buckets depicted in the system of FIG. 2A, in accordance with an embodiment of the invention.

FIG. 2B depicts a graph of credits per bucket as a function of elapsed time for a specific one of the group of buckets depicted in the system of FIG. 2A (i.e., bucket zero (0)). If bucket zero is updated first and then buckets 1-4,095 are updated, after a cycle is completed, the update procedure starts over again with bucket zero.

In the embodiment of FIG. 2B, bucket zero is updated once every 4,096 time intervals and credits are added only at an update. Therefore, the number of credits that are added at each update must be adjusted to account for the number of time intervals that have elapsed between updates. For example, if it is desired to update the credit bucket with Y credits every time interval, then the number of credits added to the bucket after 4,096 time intervals have elapsed between updates is [(Y credits/time interval)*(4,096 time intervals)].

Figure 10:
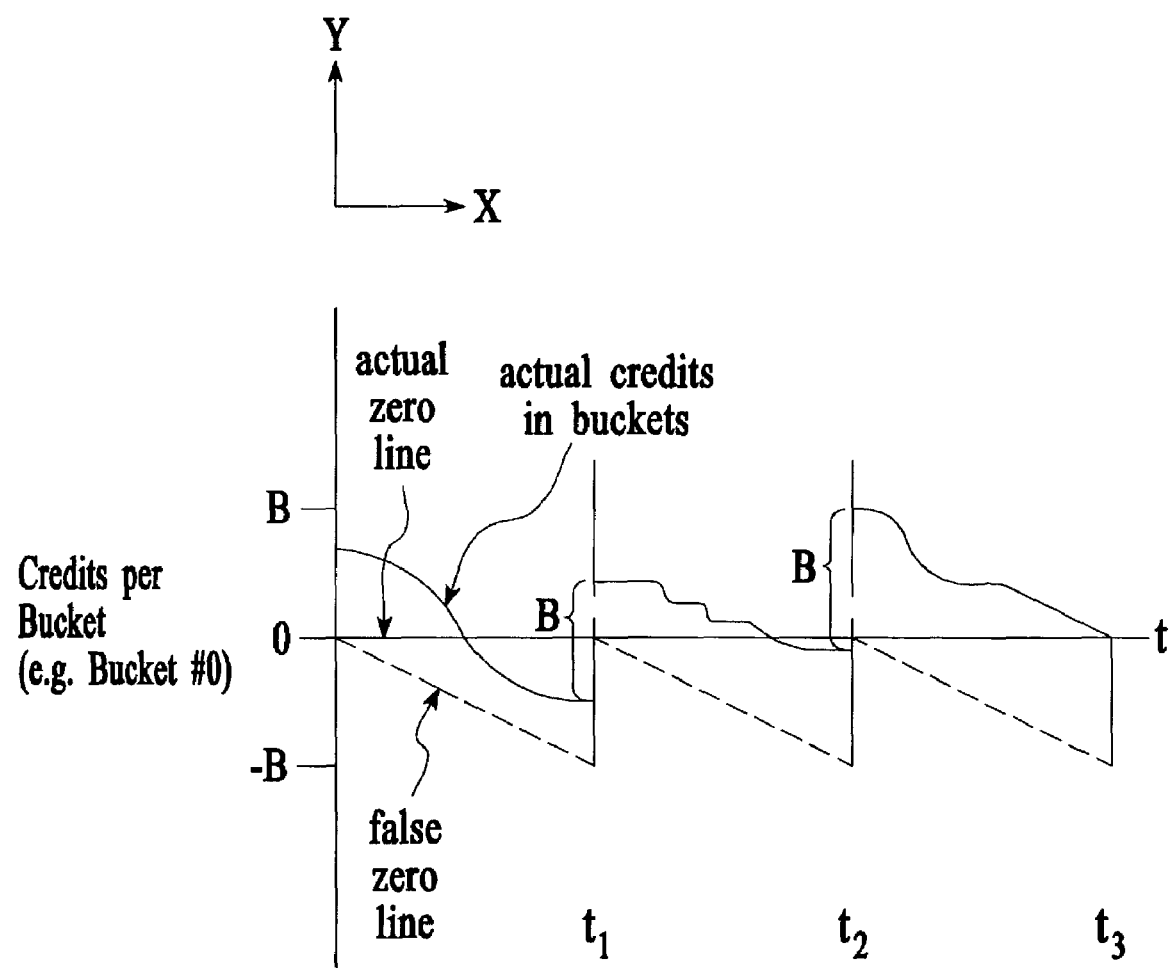
FIG. 10 is a graph depicting an example of credits per bucket as a function of time over a time period in which the bucket is accessed multiple times in response to received packets, in accordance with an embodiment of the invention.

In the embodiment of FIG. 2B, 10,000 credits are added at each credit bucket update (i.e., every 4,096 µs). Because the credit buckets are updated on a round-robin basis instead of at each time interval, the number of credits added at each update is larger. This update approach to updating a large group of credit buckets requires fewer hardware resources than an approach that updates every bucket each time interval, since only a single credit bucket is updated each time interval. The round-robin update procedure described is exemplary only; other update procedures are possible.

In an embodiment, the credit bucket has a credit maximum, i.e. a level beyond which no more credits can be added to the bucket. In such case, if credits added during a bucket update exceed the credit maximum, then the number of credits in the bucket is limited to the credit maximum.

Figure 1A:
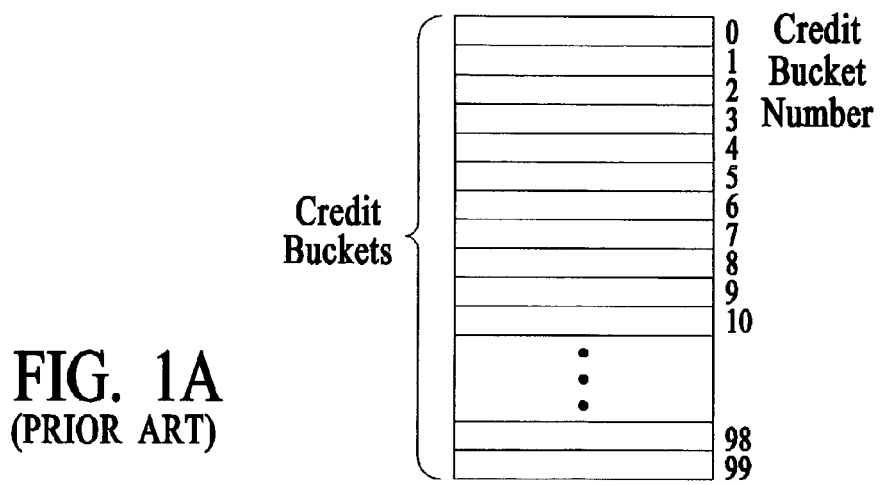
FIG. 1A depicts an embodiment of a prior art system comprising one-hundred (100) credit buckets that are each updated at every time interval.
Figure 1B:
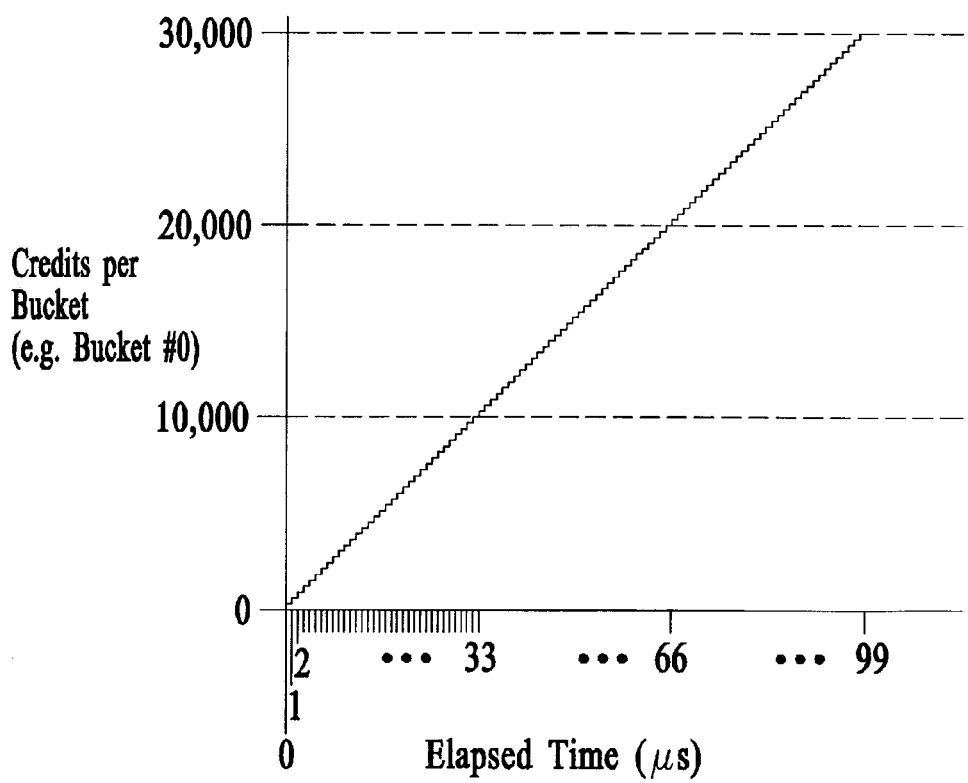
FIG. 1B depicts a graph of credits per bucket as a function of elapsed time for a specific one of the one-hundred credit buckets depicted in FIG. 1A.
Figure 3:
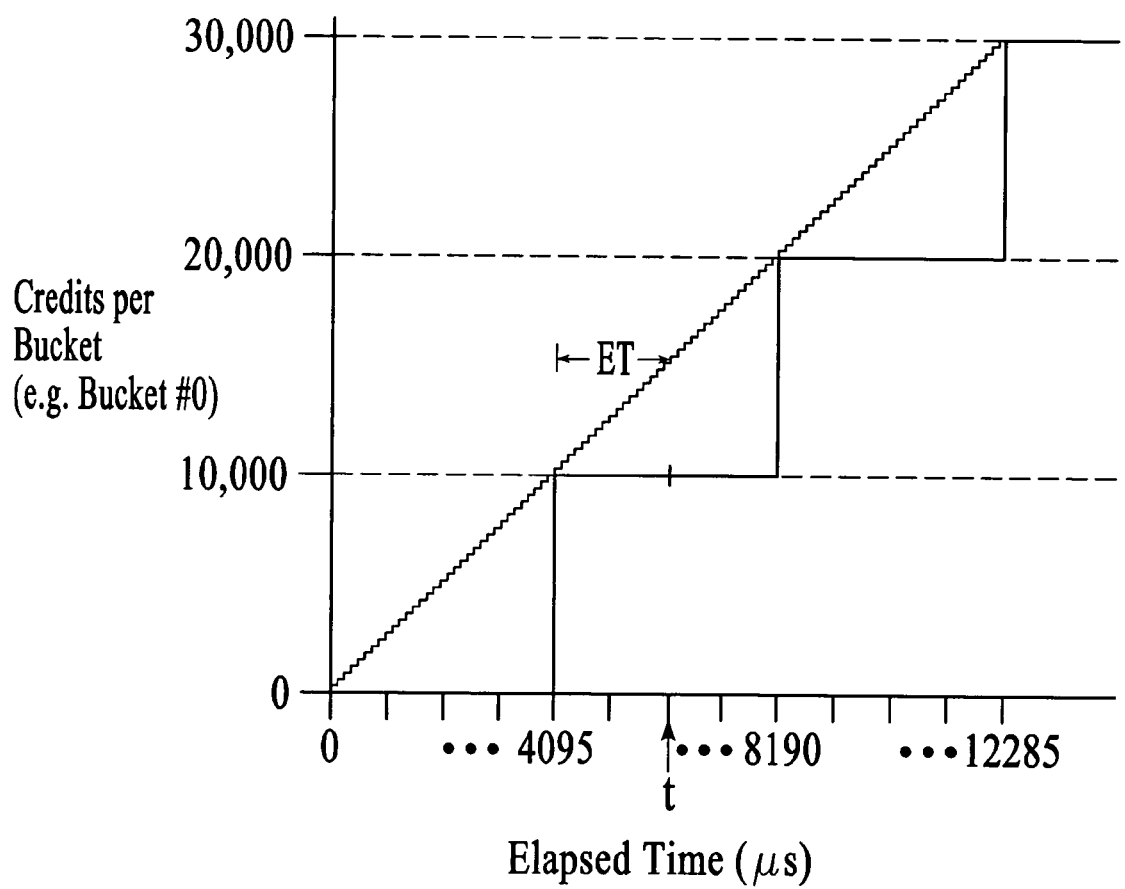
FIG. 3 depicts graphs of credits per bucket as a function of elapsed time for an individual bucket of a group of credit buckets using two different update procedures.

FIG. 3 depicts graphs of credits per bucket as a function of elapsed time for an individual bucket of a group of credit buckets using two different update procedures. The graph having a "smooth" update profile represents what happens when each of the credit buckets is updated at each time interval, as described above with reference to FIGS. 1A and 1B. The graph having a more "coarse" update profile represents what happens when the credit buckets are updated on a round-robin basis, as described with reference to FIGS. 2A and 2B. Although the update profiles that result from the two update techniques are different, upon each round-robin update, the number of credits in a bucket is the same regardless of which update technique is used. Although the number of credits in a bucket is the same upon each round-robin update, the number of credits added to a credit bucket at the times between round-robin updates will be different.

FIG. 3 illustrates the difference in the number of credits that are available in bucket zero using the "smooth" update approach as opposed to the "coarse" update approach. For example, if bucket zero is accessed at time "t", under the "smooth" update approach, approximately 15,000 credits are available in bucket zero. In contrast, under the "coarse" update approach, only 10,000 credits are available in bucket zero because the bucket is in-between round-robin updates. If the credit bucket is accessed to forward a packet with an equivalent credit value of 12,000 credits, under the "smooth" update approach, the credit bucket would have enough credits to allow the packet to be forwarded. However, under the "coarse" update approach, the credit bucket would not have enough credits to allow the packet to be forwarded and the packet could be held or dropped. Although the updating of a large group of credit buckets on a round-robin basis reduces the amount of hardware that is required to support the credit bucket updates, the traffic profile that results from the update technique will likely deviate from the traffic profile that results from updating credit buckets at every time interval. For example, the "smooth" update approach will produce a consistent traffic profile, while the "coarse" update approach will produce a more inconsistent traffic profile. It is desirable to have a traffic profile that mimics the traffic profile of the smooth update approach.

In accordance with an embodiment of the invention, only a portion of the credit buckets are updated each time interval (i.e., one credit bucket is updated each time interval on a round-robin basis), however, the decision to forward a packet is based on an "adjusted" credit value rather than an actual credit value for the respective bucket. In an embodiment, the adjusted credit value represents a credit value that has been prorated to account for the time that has elapsed between credit bucket updates. For example, with reference to FIG. 3, if bucket zero is accessed at time t for the forwarding of a packet, an estimate can be made of how many credits would be available in bucket zero at time t had the bucket been updated every time interval. The estimated credit value is referred to herein as an adjusted credit value.

In one embodiment, the adjusted credit value for a credit bucket is calculated by a formula: [adjusted credit value=actual credit value+prorated credit value]. In the stated formula; the actual credit value is the number of credits that exist in the bucket at time t; the prorated credit value represents the number of credits that have accrued to (although not yet deposited into) the credit bucket since the time of the last update. In one embodiment, the prorated credit value is calculated by a formula: (credit bucket refresh rate)*(elapsed time since last update). The credit bucket refresh rate is the rate that credits are accrued to the bucket, in credits per unit time. The elapsed time is the amount of time that has elapsed between the last update of the bucket and time t. In the embodiment of FIG. 3, the credit bucket refresh rate is: [(10,000 credits/update)/(4,096 μs/update)] =2.44 credits/μs. The elapsed time is depicted as "ET" in FIG. 3 and is equal to: t μs−4,096 μs. The prorated credit value at time t, therefore, is [(t μs−4,096 μs)*(2.44 credits/μs)]. In the example of FIG. 3, the actual credit value at time t is 10,000. If the time t is half-way between updates, then the adjusted credit value would be calculated as 10,000+ ((2.44 credits/μs)*(2048 μs))=15,000 credits. The prorated credit value is an estimate of how many credits have accrued to the bucket in the time that has elapsed since the last update of that bucket. In an embodiment, the prorated credit value does not represent credits that are actually in the bucket. Rather, the prorated credit value represents credits that are "on loan" for use in forwarding packets. In an embodiment, the "loan" is "repaid" when the credit bucket is updated.

Figure 4:
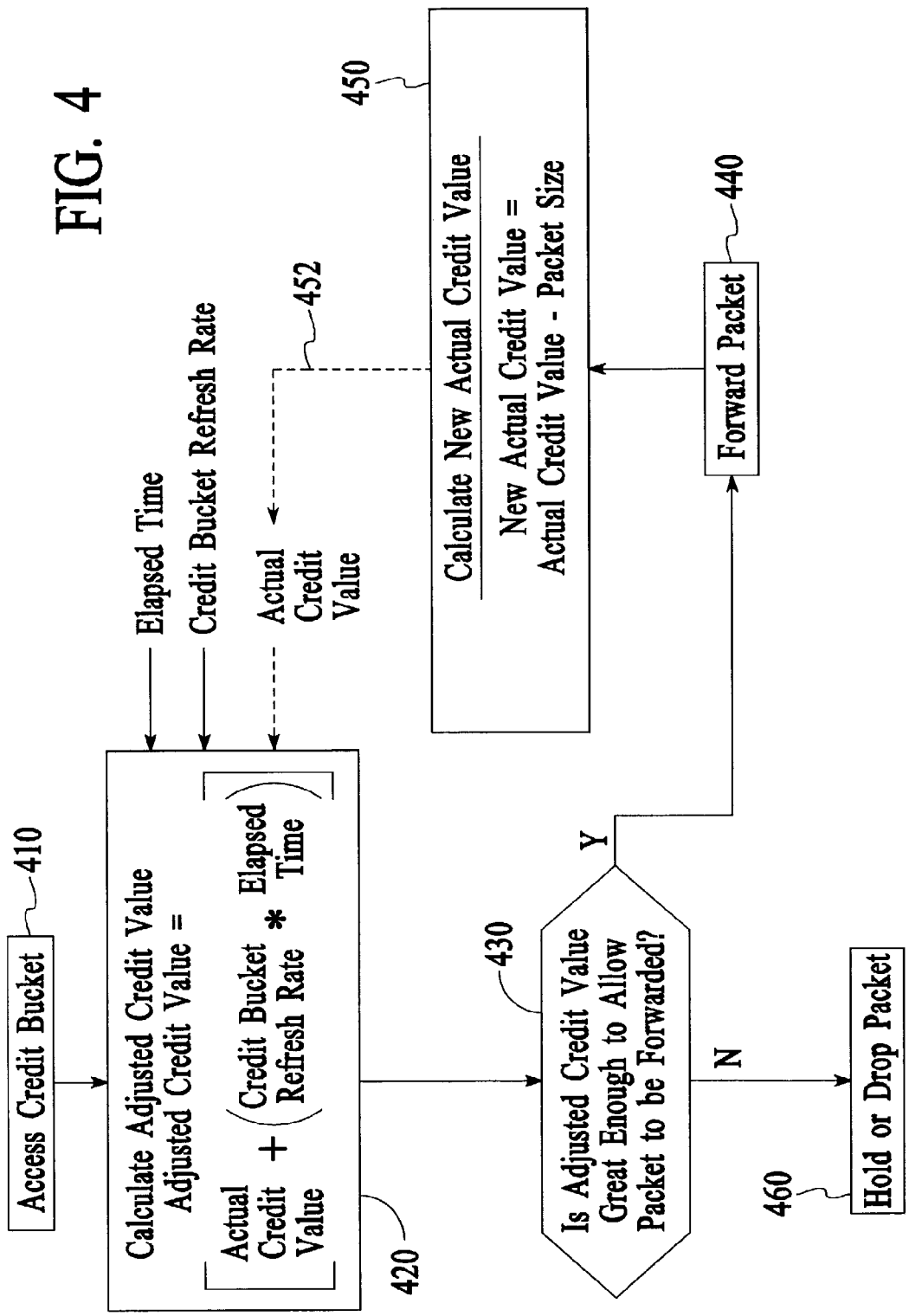
FIG. 4 is a flow diagram of a method for controlling the flow of traffic with a credit bucket, in accordance with an embodiment of the invention.

FIG. 4 is a flow diagram of a method for controlling the flow of traffic using a credit bucket when the credit bucket is accessed for the forwarding of a packet. At block 410, the credit bucket is accessed. At block 420, the adjusted credit value is calculated. In an embodiment, the adjusted credit value is calculated by the formula: [adjusted credit value=actual credit value+(credit bucket refresh rate*elapsed time)]. The elapsed time is the time since the last refresh of a particular bucket. In an embodiment, elapsed time is a function of the number of credit buckets in a group. For example, the elapsed time may be calculated by a formula: [elapsed time=(number of buckets that have been updated since the last update of the bucket)*(time interval/bucket)]. In a system of 4,096 buckets with a time interval per bucket of 1 μs, if an adjusted credit value is being calculated for bucket 1,340 while bucket 3,445 is being updated, then the elapsed time is calculated as follows: (3,445−1,340 buckets updated since last update of bucket 1,340)*(1 μs/bucket)=2,105 μs.

Once the adjusted credit value is calculated, at block 430, a determination is made as to whether or not the adjusted credit value is great enough to allow the packet to be forwarded. In one embodiment, the determination involves determining whether the adjusted credit value is greater than the length of the packet, i.e. is the adjusted credit value greater than the equivalent credit value for a packet, where the equivalent credit value for a packet is the amount of credits required to send a given packet. For example, if a packet is 100,000 bytes and a credit allows 1,000 bytes to be forwarded, then the equivalent credit value of the packet= [(100,000 bytes)/(1,000 bytes/credit)]=100 credits. In an alternative embodiment, the determination involves determining whether the adjusted credit value is greater than zero. If the adjusted credit value is greater than zero, then packets are forwarded even if forwarding causes the actual credits to go negative.

If the adjusted credit value is great enough to allow the packet to be forwarded, then at block 440 the packet is forwarded. At block 450, a new actual credit value is calculated. The new actual credit value is the number of credits that remain in the credit bucket after the packet is forwarded. In an embodiment, the new actual credit value is calculated by a formula: [new actual credit value=actual credit value−equivalent credit value of the packet (packet size)]. After the new actual credit value is calculated, the value is used (as indicated by dashed line 452) as the actual credit value at block 420 for a subsequent calculation of the adjusted credit value for that particular credit bucket.

If the adjusted credit value is not great enough to allow the packet to be forwarded, then at block 460 the packet is held or dropped. For example, the packet may be held in a buffer until sufficient credits are available to forward the packet, or, the packet may be deleted from the buffer without being forwarded. Alternatively, the packet may be marked instead of being dropped.

Figure 5:
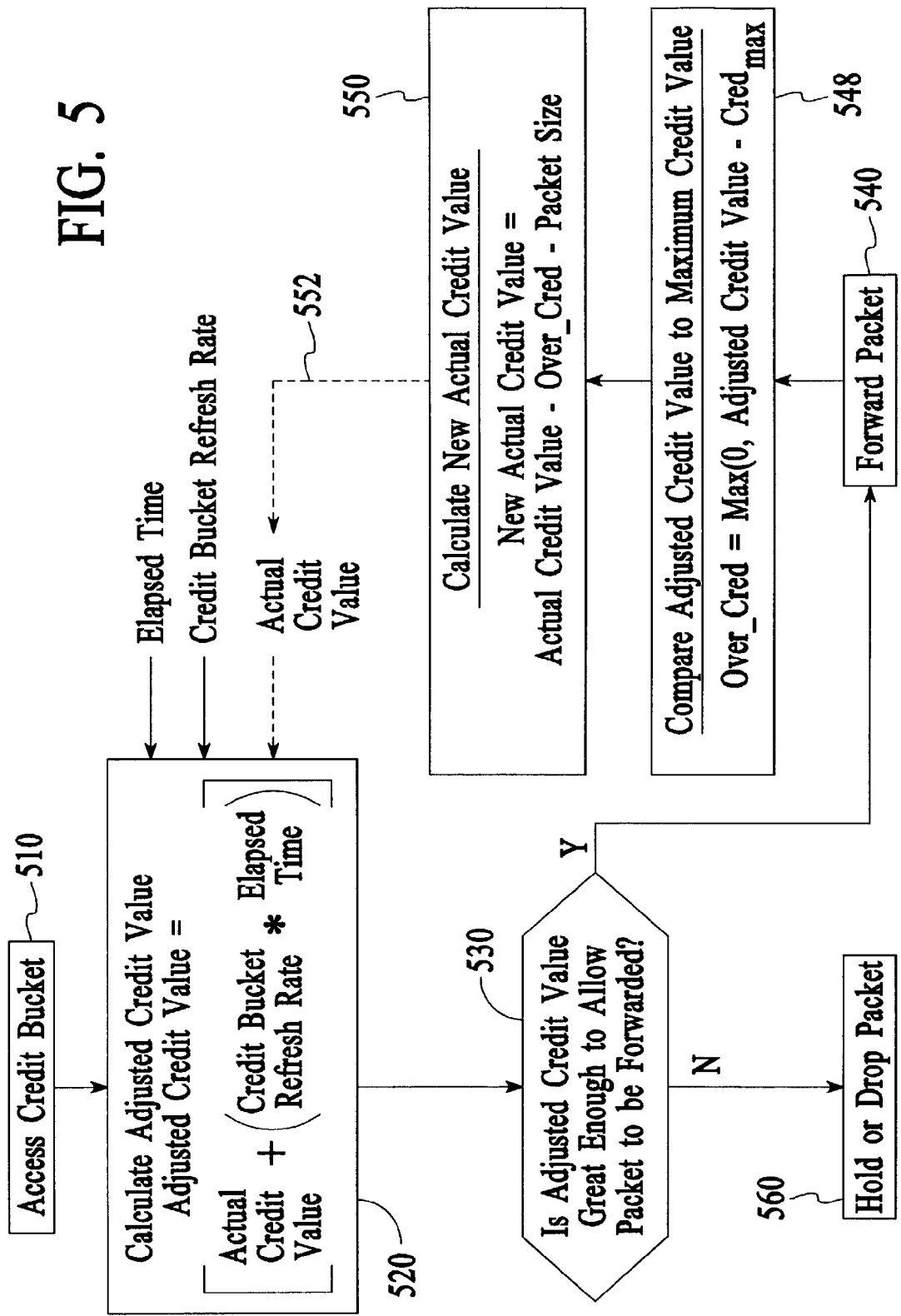
FIG. 5 is a flow diagram of another method for controlling the flow of traffic with a credit bucket, in accordance with an embodiment of the invention.

In an embodiment, if the calculated adjusted credit value exceeds a maximum credit value ($cred_{max}$) for the bucket, then the magnitude of the excess must be compensated for in the calculation of the new actual credit value. FIG. 5 depicts a flow diagram of another method for controlling the flow of traffic within a particular credit bucket that includes consideration of a maximum credit value for the credit bucket. At block 510, the credit bucket is accessed. At block 520, the adjusted credit value is calculated. In the embodiment, the adjusted credit value is calculated by the formula: [adjusted credit value=actual credit value+(credit bucket refresh rate*elapsed time)]. Once the adjusted credit value is calculated, at block 530, a determination is made as to whether or not the adjusted credit value is great enough to allow the packet to be forwarded. If the adjusted credit value is great enough to allow the packet to be forwarded, then at block 540 the packet is forwarded. At block 548, the adjusted credit value is compared to the maximum credit value. If the adjusted credit value exceeds the maximum credit value, then the magnitude of the excess credits is determined. An example algorithm is given as: [over_cred=max(0, adjusted credit value−$cred_{max}$)], such that over_cred equals the difference between the adjusted credit value and the maximum credit value if the adjusted credit value exceeds the maximum credit value or zero if the adjusted credit value does not exceed $cred_{max}$. At block 550, a new actual credit value is calculated. The new actual credit value is the number of credits that remain in the credit bucket after the packet is forwarded. In the embodiment, the new actual credit value is calculated as: [new actual credit value=actual credit value−over_cred−equivalent credit value of the packet (packet size)]. Including the over_cred value in the calculation compensates for times when the maximum credit value is exceeded by the adjusted credit value. After the new actual credit value is calculated, the value is used (as indicated by dashed line 552) as the actual credit value at block 520 for a subsequent calculation of the adjusted credit value for that particular credit bucket. If the adjusted credit value is not great enough to allow the packet to be forwarded, then at block 560 the packet is held or dropped. Alternatively, the packet could be marked.

Figure 6:
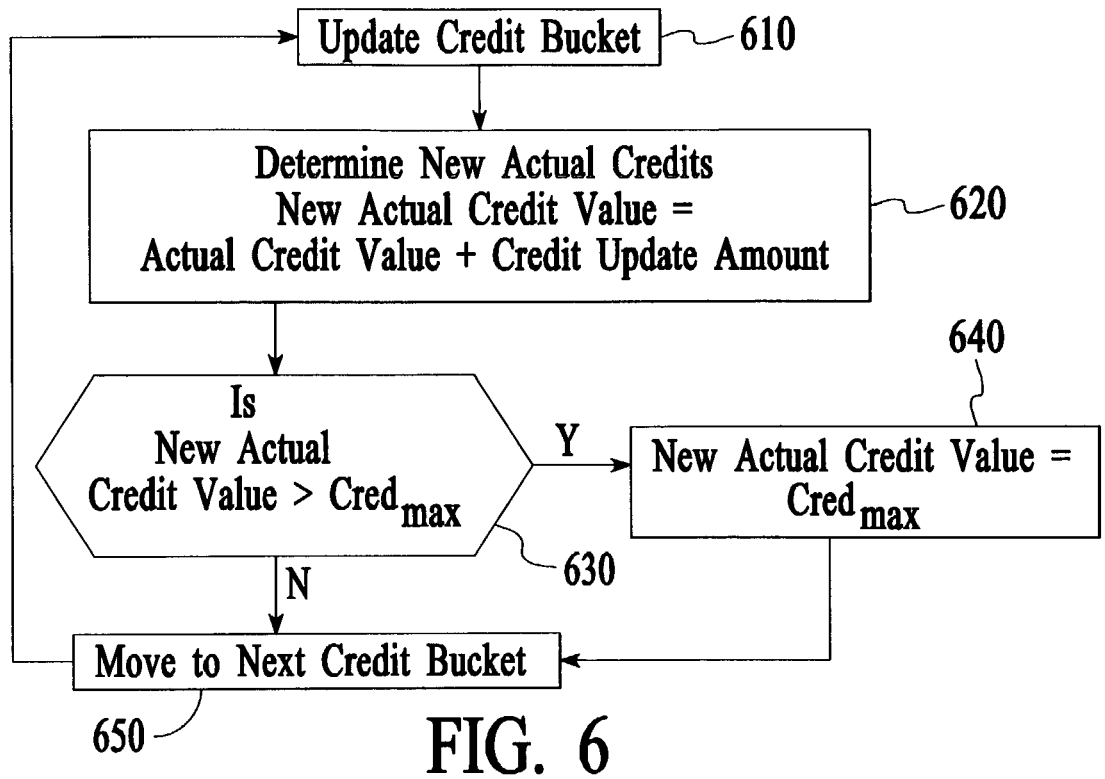
FIG. 6 is a flow diagram of an embodiment of a method for updating a group of credit buckets, in accordance with an embodiment of the invention.

FIG. 6 is a flow diagram of an embodiment of a method for updating a group of credit buckets. The method depicted in the embodiment of FIG. 6 may be used in conjunction with the method for determining an adjusted credit value when a credit bucket is accessed, as described with reference to FIGS. 4 and 5.

At block 610, a credit bucket is updated. For example, bucket zero of the 4,096-bucket system depicted in FIG. 2a may be updated. Alternatively, a portion (i.e., a subset) of buckets is updated together. For example, buckets 1-3 of the system depicted in FIG. 2a may be updated together.

At block 620, a new actual credit value is determined. In an embodiment, the new actual credit value may be calculated by a formula: [new actual credit value=actual credit value+credit bucket update amount]. In an embodiment, the new actual credit value calculated with reference to FIG. 6 refers to the same value as the new actual credit value calculated with reference to FIGS. 4 and 5; however, the value is merely calculated at a different stage in the process. For example, the new actual credit value calculated with reference to FIGS. 4 and 5 is calculated at a time of access of the bucket to forward a packet, whereas the new actual credit value calculated with reference to FIG. 6, is calculated at the time of a bucket update.

At block 630, a determination is made as to whether or not the new actual credit value is greater than the maximum number of credits allowed in the bucket ($cred_{max}$). If the new actual credit value is greater than $cred_{max}$, then at block 640, the new actual credit value is assigned to be equivalent to $cred_{max}$. If the new actual credit value is not greater than $cred_{max}$, then the new actual credit value is valid.

Once the new actual credit value is set, at block 650, the next bucket in the group of credit buckets is updated. The process is repeated for all buckets. In an embodiment, the process is repeated on a round-robin basis for each credit bucket in the group of credit buckets. If multiple credit buckets are updated at each time interval, then at block 650, the next sub-set of the credit buckets is updated.

Figure 7:
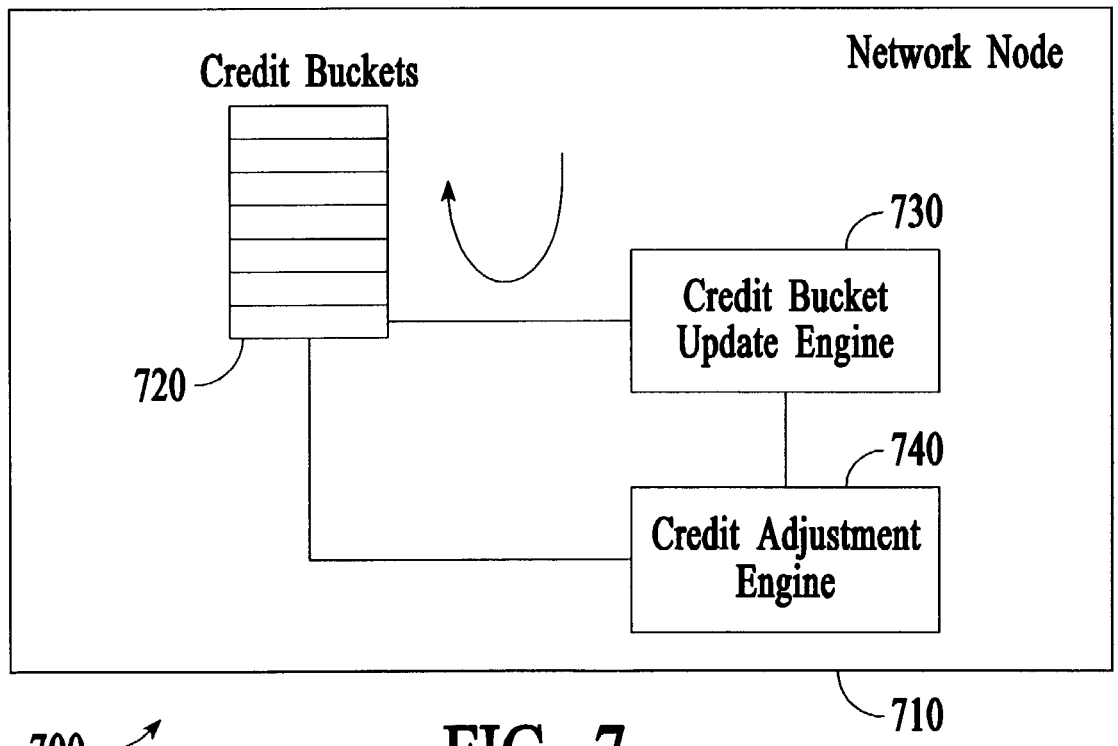
FIG. 7 depicts an embodiment of a system for updating a group of credit buckets and for determining the adjusted credit values for the buckets, in accordance with an embodiment of the invention.

FIG. 7 depicts an embodiment of a system for updating a group of credit buckets and for determining the adjusted credit values for the buckets. Network node 710 includes a group of credit buckets 720, a credit bucket update engine 730, and a credit adjustment engine 740. The credit bucket update engine is communicatively coupled to the group of credit buckets and to the credit adjustment engine. The credit bucket update engine refreshes one or more credit buckets of the group of credit buckets by adding a new allotment of credits to the bucket or buckets at a known time interval. In an embodiment, the credit bucket update engine updates the group of credit buckets over multiple time intervals, so that a portion of the group of credit buckets is updated during each time interval of the multiple time intervals. In an embodiment, the credit bucket update engine updates the group of credit buckets on a round-robin basis at a rate of one credit bucket per time interval. As described above with reference to FIG. 2b, the credit value of each round-robin update is a function of the credit bucket refresh rate multiplied by elapsed time between updates of the credit bucket.

The credit adjustment engine is communicatively coupled to the credit bucket update engine and to the group of credit buckets. The credit adjustment engine is configured to determine an adjusted credit value when a credit bucket is accessed to forward a packet, as described above with reference to FIGS. 2a-6.

Figure 8:
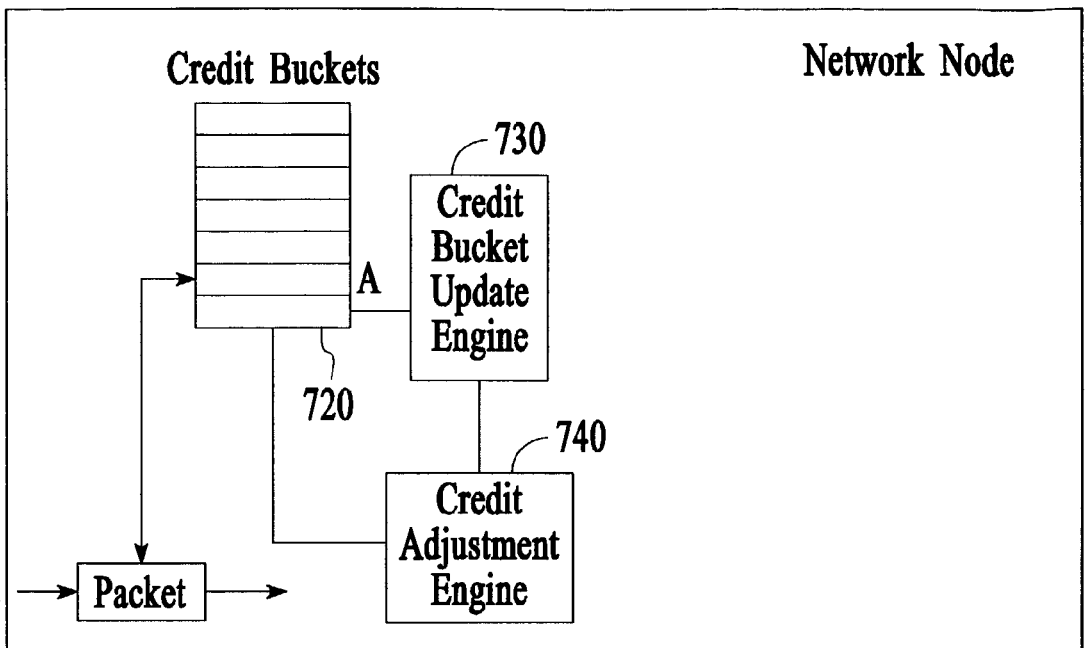
FIG. 8 depicts an example of operation of the system depicted in FIG. 7, in accordance with an embodiment of the invention.

Operation of the system depicted in FIG. 7 is described with reference to FIG. 8. In the example of FIG. 8, it is assumed that a packet is received at the network node and classified into a traffic class that corresponds to one of the credit buckets in the group of credit buckets. To determine how the packet should be handled, the credit bucket relating to the packet is accessed (as indicated by the "A" next to the credit bucket). In response to the credit bucket access, the credit adjustment engine calculates an adjusted credit value based upon the credit value for the bucket and the credits that have accrued to the bucket since the last time the bucket was accessed to forward a packet. In an embodiment, to calculate an adjusted credit value, a prorated credit value is first calculated by the formula: (credit bucket refresh rate*elapsed time since last update). The credit adjustment engine then calculates the adjusted credit value using the formula: [adjusted credit value=actual credit value+prorated credit value]. In an embodiment the adjusted credit value is calculated by the formula: [adjusted credit value=actual credit value+(credit bucket refresh rate*elapsed time since last update)].

In one embodiment, if credit bucket A has a maximum credit value, then the adjusted credit value is the minimum of the maximum credit value and the just calculated adjusted credit value. This algorithm may be expressed as: [Min. (max. credit value), ((actual credit value in bucket a)+(credit bucket refresh rate*elapsed time since last update))].

Figure 9:
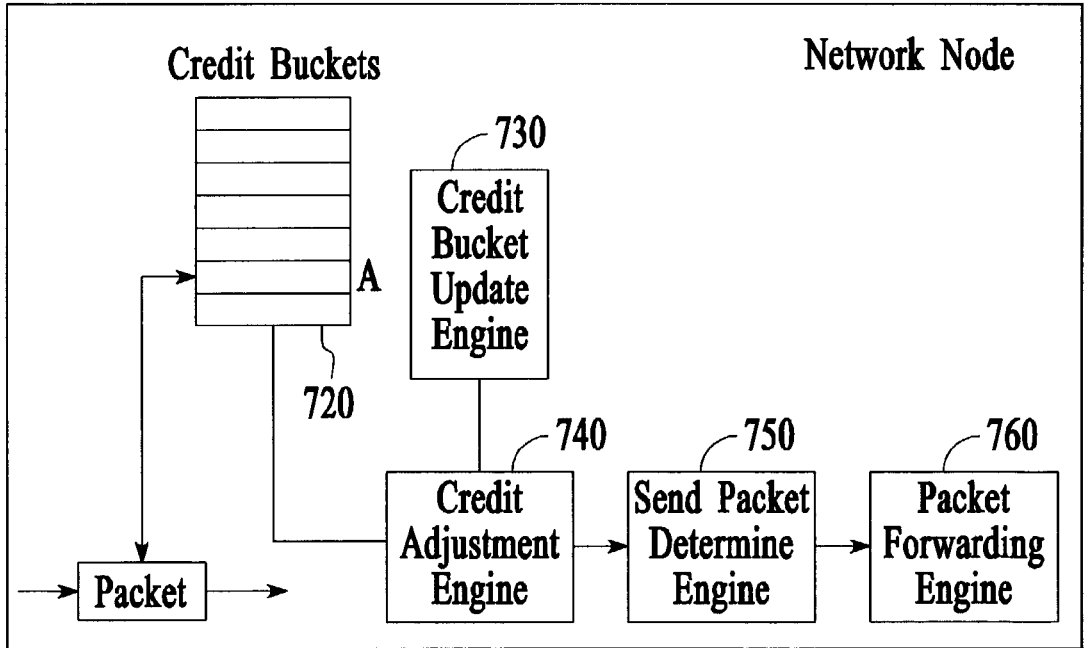
FIG. 9 depicts an embodiment of a system for updating a group of credit buckets, for determining an adjusted credit value for an individual bucket, and for determining whether to send a packet in response to the adjusted credit value, in accordance with an embodiment of the invention.

FIG. 9 depicts an embodiment of a system for updating a group of credit buckets, for determining an adjusted credit value for an individual bucket, and for determining whether to send a packet in response to the adjusted credit value. The system includes a group of credit buckets 720, a credit bucket update engine 730, a credit adjustment engine 740, a send packet determine engine 750, and a packet forwarding engine 760. In the embodiment of FIG. 9, the credit adjustment engine is communicatively coupled to the send packet determine engine, to the credit bucket update engine, and to the group of credit buckets.

In one embodiment, continuing from the embodiment described with reference to FIG. 8, bucket A has been accessed to forward a packet and the credit adjustment engine 740 has determined an adjusted credit value for bucket A. The credit adjustment engine communicates the adjusted credit value for bucket A to the send packet determine engine 750. The send packet determine engine compares the adjusted credit value against the equivalent credit value of the packet. Packet size may be in bits, bytes or other measurement. In one embodiment, the send packet determine engine calculates the equivalent credit value of the packet based upon the size of the packet and then compares the adjusted credit value against the equivalent credit value of the packet. If the adjusted credit value is greater than the equivalent credit value of the packet, then the send packet determine engine indicates to the packet forwarding engine 760 that the packet should be forwarded. If the adjusted credit value is less than the equivalent credit value of the packet, then the send packet determine engine indicates to the packet forwarding engine that the packet should not be forwarded. In an embodiment, the packet forwarding engine, upon receiving an indication from the send packet determine engine, either forwards or drops the packet. In an alternative to dropping, the packet forwarding engine may buffer the packet and delay forwarding of the packet rather than dropping the packet.

FIG. 10 is a graph depicting an example of credits per bucket as a function of time over a time period in which a credit bucket is accessed multiple times in response to received packets. The actual credits in the bucket (e.g. bucket zero (0)) changes in response to the forwarding of packets and the updating of the credit bucket. The value of B on the y-axis is equal to the credit bucket update amount in an example where time between updates is constant. That is, the value of B is calculated by the formula: [credit bucket update amount=credit bucket refresh rate*elapsed time between updates of bucket zero]. The value of –B is the negative of the credit bucket update amount. As bucket zero is accessed to forward various packets, the actual credits in bucket zero decreases. However, at the times that the credit bucket is updated, i.e. at times t1, t2, and t3, the bucket zero receives a new allotment of credits and the actual credits in the bucket zero increases by the amount B.

The actual zero line in FIG. 10 represents a line of zero actual credits in the credit bucket. The vertical distance (the distance on the y-axis) between the line of actual credits in the bucket and the false zero line represents the maximum available credits at any given time along the x-axis. At the time of an update, the false zero is equivalent to actual zero. That is, since no prorated credits have been accrued to the credit bucket, the actual credit value is equal to the adjusted credit value. However, as the time between updates of the credit bucket elapses, the bucket accrues more prorated credit value. Therefore, the negative magnitude of the false zero line increases as a function of the prorated credit value until the false zero line reaches a negative maximum of –B as time advances to the next update. That is, since bucket zero has accrued more prorated credits, as described above with reference to FIG. 4, more adjusted credits are available for future packet forwarding. In an embodiment, credit proration calculations and other computations described with reference to FIGS. 2-10 are implemented in hardware. For example, the hardware may perform proration calculations every time a packet is received to compute the adjusted credit values. Additionally, at every time interval, the hardware may temporarily suspend processing packets to perform an update operation on the next bucket. In an embodiment, the amount of credits added during a full cycle of updates is calculated by a formula: [(credit bucket update amount)*(total number of credit buckets)]. Therefore, if the credit bucket update amount is 10K and the total number of credit buckets is 4096, then the amount of credits added during a full cycle of updates=(10K credits/credit bucket)*(4,096 total credit buckets)=40,960K total credits added.

It shall be appreciated that not all method steps described must be performed, nor must they be performed in the order stated.

Although specific embodiments of the invention have been described and illustrated, the invention is not to be limited to the specific forms or arrangements of parts as described and illustrated herein. The invention is limited only by the claims.

What is claimed is:

1. A method for controlling traffic flow at a network node comprising the steps of:
    updating a group of credit buckets, wherein said updating comprises:
        updating all of said credit buckets during a predetermined multiple of time intervals,
        updating said credit buckets in response to said time intervals, and
        updating only a predetermined number of said credit buckets per each of said time intervals, wherein said predetermined number of said credit buckets represents a sub-set of said credit buckets, and each said sub-set is updated only after said predetermined multiple of said time intervals;
    determining an adjusted credit value for at least one of said credit buckets when said credit bucket is accessed to forward a packet, said adjusted credit value being determined as a function of a number of said time intervals that have elapsed since said credit bucket was last updated;
    comparing said adjusted credit value against an equivalent credit value of said packet; and
    based on said comparing step, forwarding, marking, or dropping said packet.

2. The method of claim 1 wherein said network node includes a send packet determine engine, and the method further comprises:
    calculating said equivalent credit value of said data packet via said send packet determine engine.

3. The method of claim 1 wherein said comparing step comprises determining that said adjusted credit value is greater than said equivalent credit value of said packet, and, based on said comparing step, forwarding said packet.

4. The method of claim 1 further comprising accruing a prorated credit value to each of said credit buckets per each of said time intervals, and wherein said prorated credit value is deposited to each of said credit buckets only after elapse of said multiple of time intervals.

5. The method of claim 4 wherein said determining an adjusted credit value comprises determining said prorated credit value for each of said time intervals, and said prorated credit value is related to a predetermined credit value accrued to said credit bucket per said time interval that has elapsed since said credit bucket was last updated.

6. The method of claim 1 wherein said predetermined number of credit buckets is one.

7. The method of claim 1 wherein said updating is performed on a round-robin basis.

8. The method of claim 7 wherein a credit value of cach round-robin update is a function of a credit bucket refresh rate multiplied by said predetermined multiple of said time intervals.

9. The method of claim 5 wherein said determining said adjusted credit value further comprises determining an actual credit value for said credit bucket at each said time interval, and wherein said adjusted credit value is the sum of said actual credit value and said prorated credit value.

10. The method of claim 9 wherein said predetermined number of said credit buckets in each said sub-set is one (1), and said prorated credit value is calculated from the formula: [credit bucket refresh rate*elapsed lime since said credit bucket was last updated].

11. The method of claim 9 wherein, for any one of said credit buckets not forwarding a packet:
   said adjusted credit value increases at each said time interval,
   said actual credit value does not increase at each said time interval, and
   said actual credit value increases only after each of said predetermined multiple of said time intervals.

12. The method of claim 1 wherein, within a time period corresponding to said multiple of time intervals, an actual credit value of said credit bucket remains constant or decreases.

13. The method of claim 1 wherein in the absence of forwarding a packet between said multiple time intervals, an actual credit value of said credit bucket remains constant between said multiple time intervals.

14. A method for controlling traffic flow at a network node comprising the steps of:
   updating a group of credit buckets on a round-robin basis, wherein said updating is performed in response to the elapse of time intervals;
   determining an adjusted credit value for at least one of said credit buckets when said credit bucket is accessed to forward a packet, said adjusted credit value being determined as a function of a number of said time intervals that have elapsed since said credit bucket was last updated, wherein said adjusted credit value is a function of a prorated credit value, and said prorated credit value corresponds to accrued credit that accrues after each of said time intervals, and wherein said prorated credit value is not deposited to said credit bucket until the elapse of a predetermined multiple of said time intervals;
   comparing said adjusted credit value against an equivalent credit value of said packet; and
   based on said comparing step, forwarding, marking, or dropping said packet.

15. The method of claim 14 wherein said adjusted credit value comprises the sum of said prorated credit value of said credit bucket and an actual credit value of said credit bucket.

16. The method of claim 15 wherein said prorated credit value is the product of a refresh rate of said credit bucket and elapsed time since said credit bucket was last updated.

17. The method of claim 14 further comprising: in response to said adjusted credit value, determining how to process said packet.

18. The method of claim 17 further comprising: in response to said determining how to process said packet comprises, forwarding said packet when said adjusted credit value is greater than an equivalent credit value of said packet.

19. The method of claim 17 further comprising: in response to said determining how to process said packet, forwarding said packet when said adjusted credit value is greater than zero.

20. The method of claim 14 wherein said updating comprises: updating said credit buckets in response to said time intervals, and wherein only a predetermined number of said credit buckets are updated at each of said time intervals, said predetermined number of said credit buckets represents a sub-set of said credit buckets, and said group of credit buckets comprises a plurality of said sub-sets; and wherein a credit value of each round-robin update is a function of a credit bucket refresh rate multiplied by elapsed time between updates of said credit bucket.

21. A method for controlling traffic flow at a network node comprising the steps of:
   updating a plurality of credit buckets by a plurality of updates, only a portion of said plurality of credit buckets being updated in each update of said plurality of updates, said updating being performed at a rate of a predetermined number of said credit buckets per time interval, said predetermined number corresponding to said portion of said credit buckets;
   determining an adjusted credit value for at least one of said credit buckets when said at least one credit bucket is accessed to forward a packet, said adjusted credit value being determined as the sum of an actual credit value for said credit bucket and an accrued credit value accrued by said credit bucket, wherein said accrued credit value is deposited to said credit bucket only after elapse of a predetermined multiple of said time intervals;
   comparing said adjusted credit value against an equivalent credit value for said packet; and
   based on said comparing step, forwarding, marking, or dropping said packet.

22. The method of claim 21 wherein said updating is performed on a round-robin basis.

23. A method for controlling traffic flow at a network node comprising the steps of:
   accruing a credit value to a credit bucket on a prorated basis according to a credit value refresh rate per time interval;
   depositing an accrued credit value to said credit bucket according to credit accrued at said credit value refresh rate during a predetermined multiple of said time intervals, said depositing step being performed only after, and in response to, elapse of said predetermined multiple of said time intervals;
   determining an adjusted credit value of said credit bucket when said credit bucket is accessed to forward a packet, wherein said adjusted credit value is a function of said accrued credit value deposited to said credit bucket according to said depositing step;
   comparing said adjusted credit value against an equivalent credit value of said packet; and
   based on said comparing step, forwarding said packet when said adjusted credit value is greater than said equivalent credit value of said packet.

24. The method of claim 23 wherein at any of said time intervals, said adjusted credit value is independent of said depositing said accrued credit value to said credit bucket, and said adjusted credit value is the sum of an actual credit value of said credit bucket and said accrued credit value.

25. A method for controlling traffic flow at a network node comprising the steps of:
   updating a group of credit buckets on a round-robin basis during a predetermined multiple of time intervals, wherein a predetermined number of said credit buckets are updated at each of said time intervals, said predetermined number of said credit buckets represents a sub-set of said credit buckets, said group of credit buckets comprises a plurality of said sub-sets, and said updating is performed in response to elapse of said multiple of time intervals, and wherein a credit value of each said sub-set update is a function of a number of said sub-sets per said group;
   determining an adjusted credit value of at least one of said credit buckets when said credit bucket is accessed to forward a packet, wherein said adjusted credit value is a function of credit accrued to said credit bucket per each said time interval;

comparing said adjusted credit value to an equivalent credit value for said packet; and based on said comparing step, forwarding, marking, or dropping said packet.

26. The method of claim 25 wherein said credit value of each round-robin update is a function of a credit bucket refresh rate and said predetermined multiple of time intervals.

27. The method of claim 25 wherein said predetermined number of said credit buckets is one.

28. The method of claim 25 wherein, based on said comparing step, said packet is forwarded when said adjusted credit value is greater than said equivalent credit value of said packet.

29. A method for controlling traffic flow at a network node comprising the steps of:
   sequentially updating each of a plurality of sub-sets of a group of credit buckets, wherein said updating of each said sub-set is performed only in response to elapse of a predetermined multiple of fixed time intervals, wherein each said sub-set represents a predetermined number of said credit buckets, and only one of said sub-sets is updated per each of said time intervals;
   calculating an adjusted credit value for at least one of said credit buckets in response to access of said credit bucket to forward a first packet, wherein said adjusted credit value is calculated using a first formula: [actual credits in said credit bucket+(credit bucket refresh rate*elapsed time since said credit bucket was last updated];
   determining whether said adjusted credit value is great enough to allow said first packet to be forwarded;
   based on said determining step, forwarding said first packet if said adjusted credit value is great enough to allow said first packet to be forwarded;
   calculating a new actual credit value in said credit bucket in response to said forwarding of said first packet, wherein said new actual credit value is calculated using a second formula: [actual credits in said credit bucket−equivalent credit value of said packet]; and
   calculating a new adjusted credit value for said credit bucket in response to access of said credit bucket to forward a second packet using a third formula: [new actual credit value+ (credit bucket refresh rate*elapsed time since said credit bucket was last updated].

30. The method of claim 29, wherein said forwarding step further comprises dropping said first packet if said adjusted credit value is not great enough to allow said packet to be forwarded.

31. The method of claim 29, wherein said forwarding step further comprises holding said first packet if said adjusted credit value is not great enough to allow said packet to be forwarded.

32. A system for controlling traffic flow at a network node comprising:
   a group of credit buckets, said group comprising a plurality of sub-sets of said credit buckets, each said sub-set comprising at least one of said credit buckets;
   a credit bucket update engine in communication with said group of credit buckets, said credit bucket update engine configured to update each said sub-set of credit buckets only after a predetermined multiple of time intervals, said credit bucket update engine further configured to update said credit buckets in response to elapse of said time intervals, and said credit bucket update engine further configured to update only one of said sub-sets after each of said time intervals; and
   a credit adjustment engine in communication wit said credit bucket update engine and said group of credit buckets, said credit adjustment engine configured to determine an adjusted credit value for at least one of said credit buckets when said credit bucket is accessed to forward a packet, said adjusted credit value being determined as a function of a number of said time intervals that have elapsed since said credit bucket was last updated.

33. The system of claim 32 further comprising a send packet determine engine in communication with said credit adjustment engine, wherein said send packet determine engine is configured to determine whether to allow said packet to be forwarded in response to said adjusted credit value.

34. The system of claim 32 wherein said credit bucket update engine updates said group of credit buckets on a round-robin basis.

35. The system of claim 32 wherein said adjusted credit value is the sum of an actual credit value and a prorated credit value, wherein said prorated credit value comprises credit accrued at each of said time intervals, said credit accrued at each of said time intervals is only deposited to said credit bucket after elapse of said multiple time intervals, and said prorated credit value is calculated by the formula: [credit bucket refresh rate*elapsed time since said credit bucket was last updated].

36. The system of claim 35 wherein the number of said credit buckets per said sub-set is one (1).

37. The system of claim 36 wherein said adjusted credit value is calculated from the formula: [actual credits in said credit bucket+(credit bucket refresh rate*elapsed time since said credit bucket was last updated)].

38. The system of claim 34 wherein a credit value of each round-robin update is a function of a credit bucket refresh rate multiplied by said predetermined multiple of time intervals.

39. The system of claim 35 wherein said adjusted credit value is a function of a prorated credit value, and said prorated credit value is calculated from the formula: [credit bucket refresh rate*elapsed time since said credit bucket was last updated], and said adjusted credit value is calculated from the formula: [actual credits in said credit bucket+ prorated credit value].

40. The system of claim 33 further comprising a packet forwarding engine in communication with said send packet determine engine, said packet forwarding engine configured to forward or drop said packet in response to an indication from said send packet determine engine.

41. A method for controlling data traffic at a network node, comprising:
   a) updating a group of credit buckets, wherein said updating comprises:
   updating all of said credit buckets during a predetermined multiple of time intervals,
   updating said credit buckets in response to said time intervals, and
   updating only a predetermined number of said credit buckets per each of said time intervals, wherein:
   said predetermined number of said credit buckets represents a sub-set of said credit buckets, and
   each said sub-set is updated only after said predetermined multiple of said time intervals;
   b) accessing at least one of said credit buckets via a data packet to be forwarded from said network node, wherein said accessing occurs at a time that does not correspond to one of said predetermined multiples of said time intervals;

c) at the time of said accessing said credit bucket, determining an adjusted credit value for said credit bucket, wherein:

said adjusted credit value comprises an estimated credit value based on an actual credit value of said credit bucket and a prorated credit value, said actual credit value corresponds to actual credits in said credit bucket, said prorated credit value corresponds to an accrued credit value that has accrued but has not been deposited to said credit bucket at the time of said accessing said credit bucket, and said prorated credit value accrues during each of said time intervals; and d) based on said adjusted credit value, forwarding, marking, or dropping said data packet.

42. The method of claim 41, wherein the number of said credit buckets per said sub-set is one (1).

43. The method of claim 42, wherein said network node includes a send packet determine engine, and the method further comprises:

e) calculating an equivalent credit value of said data packet by using said send packet determine engine.

44. The method of claim 43, wherein said equivalent credit value is based on the size of said data packet, and the method further comprises:

f) comparing said adjusted credit value against said equivalent credit value of said data packet by using said send packet determine engine.

45. The method of claim 44, wherein said network node further includes a packet forwarding engine in communication with said send packet determine engine, and the method further comprises:

g) indicating to said packet forwarding engine that said data packet should be forwarded when said adjusted credit value is greater than said equivalent credit value of said data packet from said send packet determine engine.

46. The method of claim 44, wherein said network node further includes a packet forwarding engine, and the method further comprises:

h) indicating to said packet forwarding engine that said data packet should not be forwarded when said adjusted credit value is less than said equivalent credit value of said data packet from said send packet determine engine.

47. The method of claim 44, wherein step f) comprises determining whether said adjusted credit value is greater than zero, and step d) comprises forwarding said data packet when said adjusted credit value is greater than zero.

48. The method of claim 47, wherein said forwarding said data packet results in a negative value for said actual credit value of said credit bucket.

\* \* \* \* \*